United States Patent
Kim

(10) Patent No.: US 7,668,441 B2
(45) Date of Patent: Feb. 23, 2010

(54) IMAGE RECORDING AND REPRODUCING APPARATUS CAPABLE OF RE-COMPRESSING AND RE-RECORDING RECORDED DATA AND A METHOD THEREOF

(75) Inventor: Chul-min Kim, Hwaseong-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 766 days.

(21) Appl. No.: 10/914,308

(22) Filed: Aug. 10, 2004

(65) Prior Publication Data

US 2005/0041958 A1    Feb. 24, 2005

(30) Foreign Application Priority Data

Aug. 20, 2003    (KR) .................. 10-2003-0057572

(51) Int. Cl.
    *H04N 5/76*    (2006.01)
(52) U.S. Cl. .......................... 386/111; 386/52
(58) Field of Classification Search .......... 386/46,
        386/E5.001, 124, 125, 52, 111, 109, 112;
        725/88, 75; 375/240.16, 240.12
    See application file for complete search history.

(56) References Cited

U.S. PATENT DOCUMENTS

| | | | |
|---|---|---|---|
| 5,237,397 A | | 8/1993 | Mighdoll et al. .............. 358/13 |
| 6,671,454 B1* | | 12/2003 | Kaneko et al. ............... 386/83 |
| 6,768,864 B1* | | 7/2004 | Kimura et al. ............. 386/111 |
| 7,197,189 B2* | | 3/2007 | Adelmann .................. 382/239 |
| 7,200,859 B1* | | 4/2007 | Perlman et al. ............. 725/133 |
| 7,257,316 B2* | | 8/2007 | Yamato et al. .............. 386/112 |
| 7,409,146 B2* | | 8/2008 | Kawai et al. ................ 386/131 |
| 2002/0039483 A1* | | 4/2002 | Frost et al. .................. 386/109 |
| 2002/0071633 A1* | | 6/2002 | Kimura ....................... 385/24 |

(Continued)

FOREIGN PATENT DOCUMENTS

EP    0984450 A1 *    3/2000

(Continued)

OTHER PUBLICATIONS www.compression-links.info: "Compression Links: EZ Transcoder" Internet Article, Online Mar. 7, 2003; Retrieved Apr. 25, 2005 at www.compression-links.info/link/1664.

(Continued)

*Primary Examiner*—David E Harvey
(74) *Attorney, Agent, or Firm*—Roylance, Abrams, Berdo & Goodman, LLP

(57) ABSTRACT

An image recording and reproducing apparatus for re-compressing and re-recording once stored data, and a method thereof. The image recording and reproducing apparatus comprises an encoder for compressing input digital image data by a first compression rate, thereby generating and outputting first compressed data, a storage part for storing the first compressed data, a decoder for expanding the first compressed data of the storage part to restore a digital image data, and outputting the digital image data, and a controller for controlling the decoder such that the digital image data output from the decoder is transmitted to the encoder, compressed by the encoder by a second compression rate into second compressed data, and stored to the storage part.

7 Claims, 7 Drawing Sheets

U.S. PATENT DOCUMENTS

| | | |
|---|---|---|
| 2002/0127000 A1 | 9/2002 | Yamato et al. |
| 2003/0099460 A1 | 5/2003 | Imada et al. |
| 2003/0135858 A1* | 7/2003 | Nemoto .................. 725/75 |
| 2003/0198458 A1* | 10/2003 | Greenwood ............ 386/46 |
| 2004/0136697 A1* | 7/2004 | Chang .................... 386/111 |
| 2005/0074063 A1* | 4/2005 | Nair et al. ............ 375/240.11 |
| 2005/0111835 A1* | 5/2005 | Friel et al. ............ 386/111 |

FOREIGN PATENT DOCUMENTS

| | | |
|---|---|---|
| EP | 1 195 995 A2 | 10/2002 |
| JP | 02-305053 | 12/1990 |
| JP | 06-338802 | 12/1994 |
| JP | 08-084339 | 3/1996 |
| JP | 10-257422 | 9/1998 |
| JP | 11-066741 | 3/1999 |
| JP | 2002-237141 | 8/2002 |
| JP | 2003-169291 | 6/2003 |
| JP | 2003189243 A | 7/2003 |
| JP | 2003-224822 | 8/2003 |
| KR | 1020020019779 | 3/2002 |

OTHER PUBLICATIONS

ANONIX: "Superview: Administrator's Manual Version 1.1"; Retrieved Apr. 27, 2005 at www.axonix.com/superview/downloads/docs/SVMNL_VI_CC12_PDF.pdf.

* cited by examiner

IMAGE RECORDING AND REPRODUCING APPARATUS CAPABLE OF RE-COMPRESSING AND RE-RECORDING RECORDED DATA AND A METHOD THEREOF

CROSS-REFERENCE TO RELATED APPLICATIONS

This application claims the benefit under 35 U.S.C. § 119(a) of Korean Application No. 2003-57572, filed Aug. 20, 2003, in the Korean Intellectual Property Office, the entire contents of which are incorporated herein by reference.

BACKGROUND OF THE INVENTION

1. Field of the Invention

The present invention relates to an image recording and reproducing apparatus capable of re-compressing data, and a method thereof. More particularly, the present invention relates to an image recording and reproducing apparatus which is capable of re-compressing and re-recording data previously compressed and recorded in a recording medium, and a re-recoding method thereof.

2. Description of the Related Art

With the launch of a digital satellite and a terrestrial digital broadcasting system, quality images can be transmitted almost without loss to a viewer's television. Unlike analog broadcasting systems, various additional information can be transmitted through a digital broadcasting system, thereby enabling viewers to enjoy a variety of information. For example, viewers enjoy a variety of entertainments through digital broadcasting. Due to these advantages, there have been growing interests in the image recording and reproducing apparatuses for recording and reproducing image data of high quality, such as digital broadcasting.

In general, an image recording and reproducing apparatus comprises a video cassette recorder (VCR), a digital video disc player (DVDP), and a digital video recorder (DVR).

The DVR is in increasing demand for its ability to record and reproduce a multitude of digital image data such as terrestrial broadcasting, satellite broadcasting, cable broadcasting and network broadcasting through the Internet. Since the DVR records an image as a file in a hard disc drive (HDD), performing a file search for reproducing is simple, and degradation in image quality seldom occurs even if the image is repeatedly reproduced.

However, the HDD has limited storage capacity. Therefore, the DVR compresses the image data for more space-effective storage, usually employing a moving picture experts group (MPEG) format which is an efficient compression method.

However, at present, the use of image data is increasing due to the influence of an image medium-centered society, compared to the past when audio medium was the main source of public entertainment. Therefore, the number of image files recorded on the HDD has also increased. Moreover, due to the large size of high quality image data, the DVR is likely to reach its storage capacity limit no matter how large the storage capacity of the HDD of the DVR becomes.

When image data exceeds the capacity of a recording medium, pre-stored image data should be deleted, or the recording medium needs to be replaced with one having a larger capacity, or an extra recording medium should be added. However, the stored image data is sometimes reluctantly deleted, and additional expense is incurred for a replacement or additional recording medium.

SUMMARY OF THE INVENTION

An aspect of the present invention is to solve at least the above problems and to provide at least the advantages described below. Accordingly, an aspect of the present invention is to provide an image recording and reproducing apparatus for re-compressing and re-recording data in a recording medium, and a method thereof.

In order to achieve the above-described aspects of the present invention, there is provided an image recording and reproducing apparatus comprising an encoder for compressing input digital image data using a first compression rate, thereby generating and outputting first compressed data, a storage part for storing the first compressed data, a decoder for expanding the first compressed data of the storage part to restore the digital image data, and outputting the digital image data, and a controller for controlling such that the digital image data output from the decoder is transmitted to the encoder, compressed by the encoder using a second compression rate into second compressed data, and stored to the storage part.

The image recording and reproducing apparatus further comprises a key input part which outputs a re-compression command signal for conversion of the first compressed data into the second compressed data, and wherein the controller, upon receiving the re-compression command signal, controls the key input part to generate the second compressed data.

The key input part comprises a main switch which outputs one of a power-on signal for supplying power and a power-off signal for blocking the power supply, and the controller, upon receiving the power-off signal after the re-compression command signal, controls the key input part to generate the second compressed data.

The image recording and reproducing apparatus may further comprise an input signal conversion part for converting input analog image data into the digital image data and transmitting the digital image data to the encoder, and an output signal conversion part for converting the digital image data output from the decoder into the analog image data.

The image recording and reproducing apparatus may further comprise a first switch part for inputting to the encoder one of the digital image data output from the input signal conversion part and the decoder according to the controller, and the controller, upon receiving the re-compression command signal, controls the first switch part so that the digital image data output from the decoder is input to the encoder.

The image recording and reproducing apparatus may further comprise a second switch part for inputting the digital image data output from the decoder, to one of the encoder and the output signal conversion part according to the controller, and the controller, upon receiving the re-compression command signal, controls the second switch part so that the digital image data output from the decoder is input to the encoder.

The first compressed data is in a moving picture experts group (MPEG)-2 format, and the second compressed data is in one of an MPEG-4 format and a windows media video (WMV) format.

A method for re-compressing data in an image recording and reproducing apparatus which stores a first compressed data of a first compression rate. The method comprising the steps of inputting a re-compression command for converting the first compressed data into a second compressed data, upon receiving the re-compression command, expanding the first compressed data to restore into the digital image data, compressing the restored digital image data by a second compression rate, thereby generating the second compressed data, and storing the second compressed data.

The method may further comprise the steps of, after a main switch is turned off, inputting an automatic-recompression command for converting the first compressed data into the second compressed data, and upon input of the automatic-recompression command, performing the steps of restoring the first compressed data, generating and storing the second compressed data.

The first compressed data is of a MPEG-2 format, and the second compressed data is in one of a MPEG-4 format and a windows media video (WMV) format.

BRIEF DESCRIPTION OF THE DRAWING FIGURES

The above aspect and other features of the present invention will become more apparent by describing in detail exemplary embodiments thereof with reference to the accompanying drawing figures, wherein.

Throughout the drawings, it should be noted that the same or similar elements are denoted by like reference numerals.

DETAILED DESCRIPTION OF THE EXEMPLARY EMBODIMENTS

Embodiment of the present invention will be described in detail with reference to the accompanying drawing figures. Also, well-known functions or constructions are not described in detail for conciseness.

Figure 1:
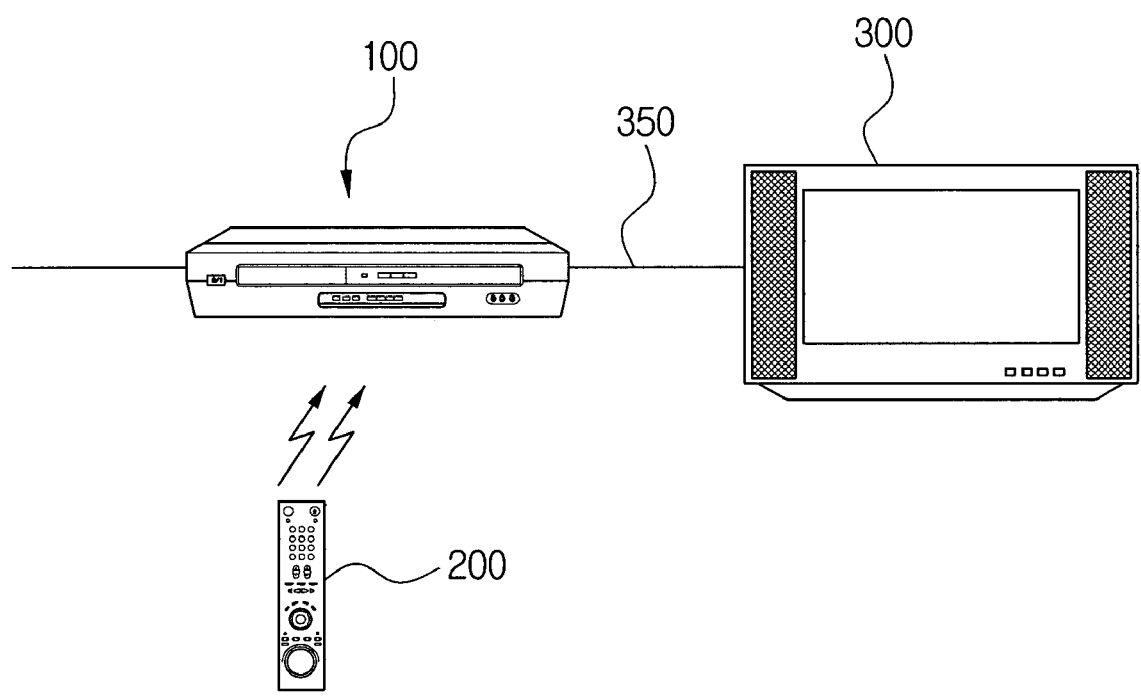
FIG. 1 is a view for outlining a display system applying an image recording and reproducing apparatus according to an embodiment of the present invention.

FIG. 1 illustrates a display system applying an image recording and reproducing apparatus according to an embodiment of the present invention. Referring to FIG. 1, the image recording and reproducing apparatus 100 is connected to a television (TV) 300 used as a display device, through a transmission cable 350. The image recording and reproducing apparatus 100 processes a signal received from a remote controller 200 which is an external device, and transmits corresponding display information to the TV 300.

Figure 2:
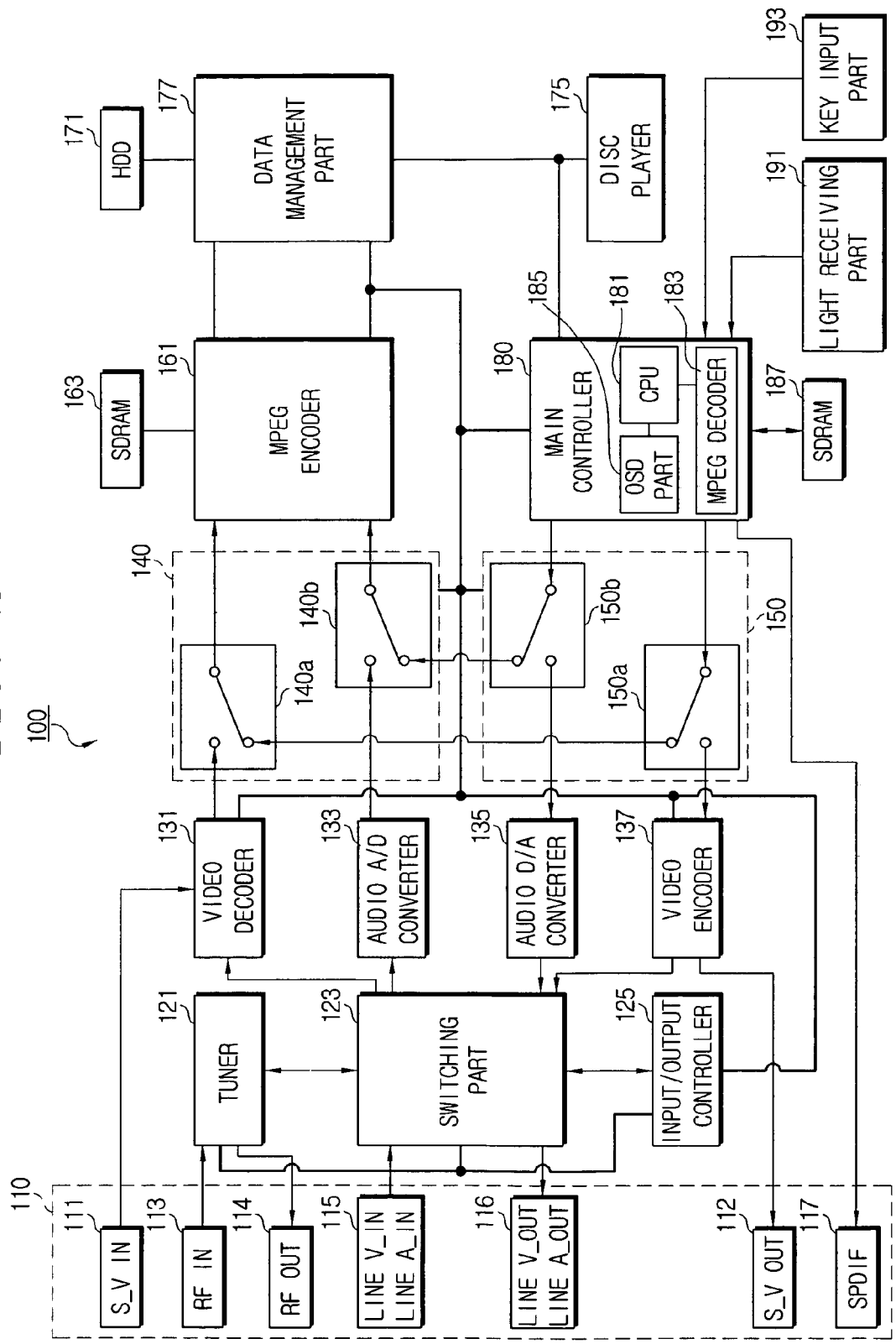
FIG. 2 is a block diagram of the image recording and reproducing apparatus of FIG. 1 according to an embodiment of the present invention.

FIG. 2 is a block diagram of an exemplary image recording and reproducing apparatus of FIG. 1. Referring to FIG. 2, the image recording and reproducing apparatus 100 comprises an input/output terminal part 110, a switching part 123, a first switch part 140, a second switch part 150, a moving picture experts group (MPEG) encoder 161, a hard disc driver (HDD) 171, and a main controller 180.

The input/output terminal part 110 receives signals from diverse image signal sources, and outputs the received signal and a signal reproduced from the HDD 171 and a disc player 175.

The input/output terminal part 110 is equipped with a super-video input terminal (S-V IN) 111, a super-video output terminal (S-V OUT) 112, a radio frequency input terminal (RF IN) 113, a radio frequency output terminal (RF OUT) 114, a line video and audio input terminal (LINE V_IN, LINE A_IN) 115, a line video and audio output terminal (LINE V_OUT, LINE A_OUT) 116, and a serial parallel digital interface (SPDIF) 117.

A tuner 121 tunes a receiving channel so that a broadcasting signal can be received through the RF input terminal 113, the broadcasting signal of a channel requested by an input/output control part 125 according to control of the main controller 180. The switching part 123, being controlled by the input/output control part 125, controls input/output terminals connected to the switching part 123 to be selectively connected with one another.

A video decoder 131, controlled by the main controller 180, decodes and converts to a digital video signal an analog video signal received through the super video input terminal 111 or the switching part 123, and outputs the digital video signal. The digital video signal output from the video decoder 131 is input to an MPEG encoder 161 through a first video path switch 140a of the first switch part 140 which is controlled by the main controller 180.

An audio analog-to-digital converter 133 converts an analog audio signal input through the switching part 123 to a digital audio signal, and outputs the digital audio signal. The digital audio video signal output from the audio analog-to-digital converter 133 is input to the MPEG encoder 161 through a first audio path switch 140b of the first switch part 140 which is controlled by the main controller 180.

The MPEG encoder 161, receives the digital video signal from the video decoder 131 and the digital audio signal from the audio analog-to-digital converter 133 through the first path-designating switching part 140, encodes signals by compression format and rate which are set by the main controller 180, and stores data for recording to the HDD 171. As a compression method for the MPEG encoder 161, an MPEG-2 method is preferred, although the embodiments of the present invention are not limited to MPEG-2. If the digital video and audio signals are recorded at standard definition (SD) bitrate of MPEG-2 6 Mbps, 3 Giga byte (GB) is required for one-hour recording.

Although the HDD 171 is used, in this embodiment, as an exemplary recording medium for storing compressed data, it should be appreciated that other recording media such as an optical recording medium and a semiconductor memory are also applicable.

A synchronous dynamic random-access memory (SDRAM) 163 is used as a buffer to temporarily store the data encoded by the MPEG encoder 161.

A data management part 177 manages recording and reproducing of the data with respect to the HDD 171 or the disc player 175. A light receiving part 191 receives an operation signal transmitted from the remote controller 200 and outputs the operation signal to the main controller 180.

The main controller 180 may comprise a single-chip integrated circuit (IC) comprising a central processing unit (CPU) 181, an MPEG decoder 183 for decoding data compressed in the MPEG format, and an on screen display (OSD) part 185 for generating data corresponding to a menu. The MPEG decoder 183 and the OSD part 185 may also comprise separate chips respectively connected to the main controller 180.

The MPEG decoder 183 decodes the MPEG compression data to restore and output the digital video and audio signals, respectively. The digital video signal output from the MPEG decoder 183 is input to a video encoder 137 through a second video path switch 150a of the second switch part 150 which is controlled by the main controller 180. The digital audio signal output from the MPEG decoder 183 is input to a digital-to analog converter 135 through a second audio path switch 150b of the second switch part 150 which is controlled by the main controller 180.

The video encoder 137, receives the digital video signal output from the MPEG decoder 183 through the second video path switch 150a, converts the digital video signal to an analog video signal and outputs the analog video signal to the switching part 123.

The digital-to-analog converter 135, receives the digital audio signal output from the MPEG decoder 183 through the second audio path switch 150b, converts the digital audio signal to an analog audio signal and outputs the analog audio signal to the switching part 123.

Hereinbelow, there will be explained processes for re-compressing using high compression rates and re-recording in the HDD 171 the data which was previously compressed by the MPEG-2 format and recorded in the HDD 171.

When an 'edit' mode is set by a user through operation buttons provided in the remote controller 200 or a key input part 193, the light receiving part 191 or the key input part 193 transmits a user's command to the main controller 180. When the main controller 180 receives the user's command for operating the image recording and reproducing apparatus in the 'edit' mode, the main controller 180 controls the OSD part 185 to output an 'edit' menu. The output 'edit' menu is transmitted to the TV 300 through the second video path switch 150a, the video encoder 137, the switching part 123, and the line video and audio output terminal 116, and as a result, the 'edit' menu screen is displayed on the TV 300.

Then, the user moves a cursor on the 'edit' screen displayed on the TV 300 using direction keys in the remote controller 200 or the key input part 193, and selects menus indicated by the cursor using a 'confirmation' key. The main controller 180 controls the OSD part 185 to display or change the menu screens, characters, symbols, and pictures according to a user's command.

Figure 3A:
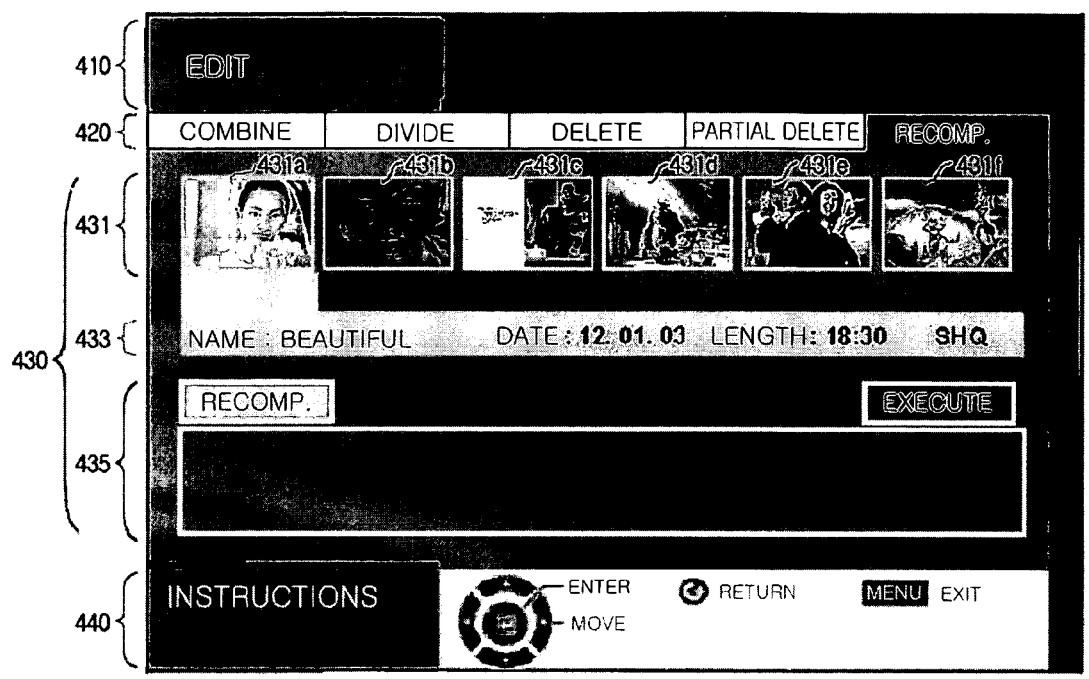
FIGS. 3A through 3D are images illustrating examples of re-compressed and re-recorded data, using a menu screen.

FIGS. 3A through 3D are images illustrating examples of re-compressed and re-stored data, using the 'edit' menu screen displayed on the TV 300. Since the image recording and reproducing apparatus is set in the edit mode, the TV 300 displays the menu screen in the 'edit' mode, as shown in FIG. 3A. A 'Edit' is displayed on top of the menu screen, indicating the menu item 410 currently displayed on the menu screen. Additionally, 'Instructions' is displayed on the bottom 440 of the menu screen providing a link for guidance of operation of the keys. Information on the keys of the remote controller 200 and the functions of the keys is also displayed at the bottom 440 of the menu screen.

Sub-menus 420 for the current menu item 410 are displayed under the current menu item 410. In FIG. 3A, items of 'Combine', 'Divide', 'Delete', 'Partial Delete', and 'Recomp (ression)' are illustrated as sub-menus of the 'Edit' menu. When a user places the cursor on the 'Recomp' menu using the direction keys of the key input part 193 or the remote controller 200, the main controller 180 controls the data management part 177 to read information on the data stored in the HDD 171. The information on the data may comprise a front page of an image, a title, a storage date, running time and image quality. The main controller 180 controls the OSD part 185 to output a signal corresponding to the data information, and the output signal is transmitted to the TV 300 passing through the second video path switch 150a, the video encoder 137, the switching part 123, and the line video and audio output terminal 116.

The data information is displayed on a 'Recomp' window 430 as shown in FIG. 3A. The 'Recomp' window 430 displays a data list 431 currently stored in the HDD 171 by horizontally showing front pages 431a to 431f of respective data. If the user moves downward the cursor placed on 'Recomp' using the direction key, the cursor is placed on the data list 431, and data information 433 on an item indicated by the cursor is displayed on the bottom of the data list 431. More specifically, the cursor is placed on the front page 431a of the first data such that the title, the storage date, the running time and the image quality of the first data are displayed as the data information 433, as shown in FIG. 3A.

Figure 3B:
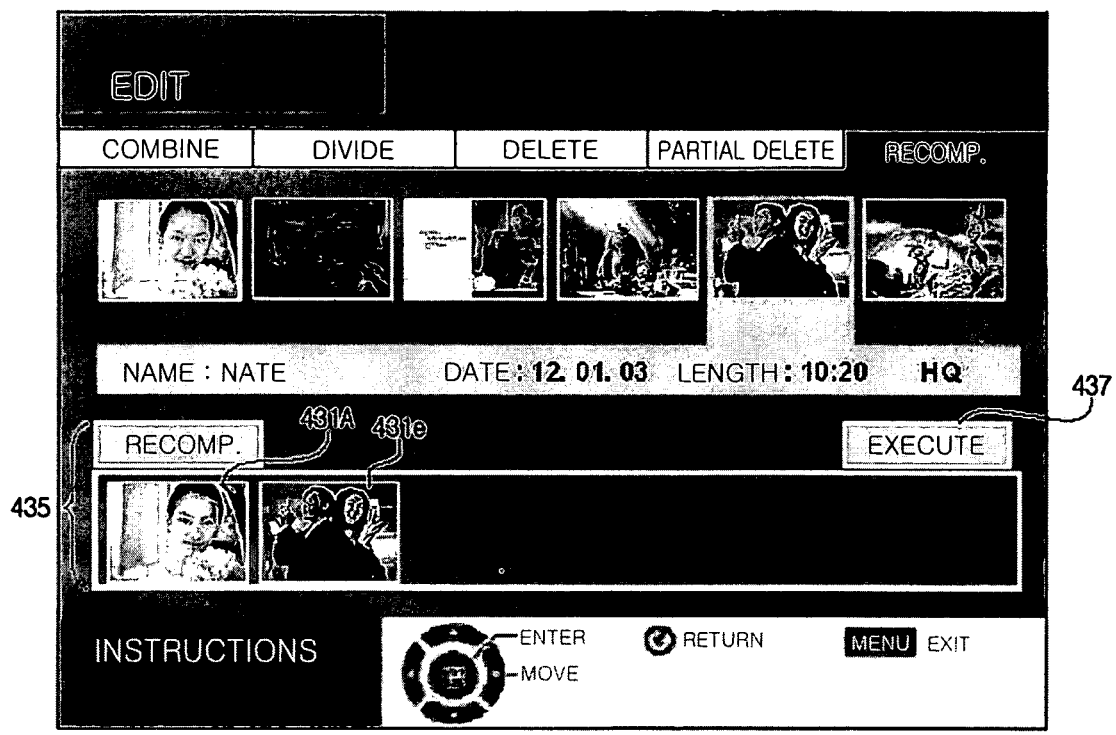

As the user selects data for re-compression by moving the cursor in a horizontal direction using the direction keys, placing the cursor on desired data and pressing the confirmation key, the front pages of the selected data are displayed on a re-compression data list 435. FIG. 3B illustrates a resultant screen displaying the front pages 431a and 431e of the first and fifth data as selected from the data list 431, on the re-compression data list.

Figure 3C:
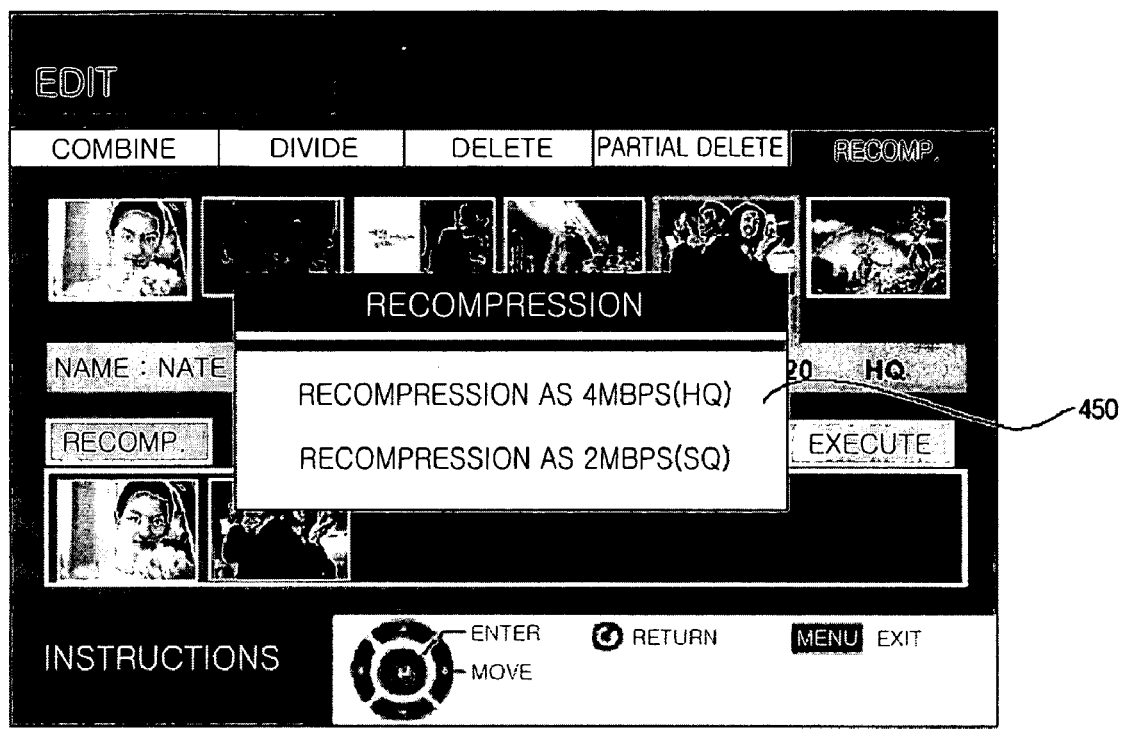

In order to re-compress the selected data, a user moves the cursor down using the direction key and places the cursor on 'Execute' item 437, and presses the confirmation key. Therefore, as shown in FIG. 3C, a re-compression rate setting window 450 appears in the center of the screen. For example, a high-quality (HQ) method records the digital video and audio signals using 4 Mbps bitrate, and a standard-quality (SQ) method records the signals using 2 Mbps bitrate.

Figure 3D:
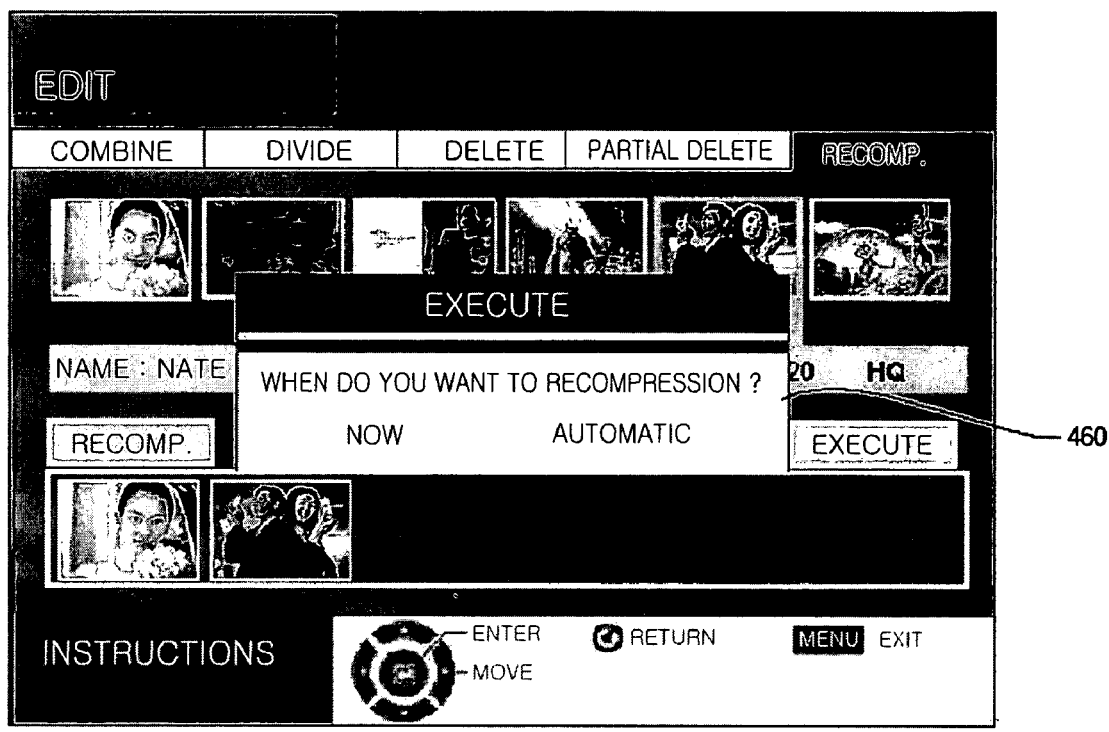

When any one of the two compression rates displayed on the re-compression rate setting window 450 is selected by the user through the direction keys and the 'confirmation' key, a re-compression time setting window 460 is displayed in the center of the screen, as shown in FIG. 3D. If the user selects 'Now' for re-compression time, re-compression of the selected data begins immediately. If the user selects 'Automatic' for re-compression time, the selected data are re-compressed after a main switch of the image recording and reproducing apparatus is turned off by the user, such that the data re-compression is performed when the image recording and reproducing apparatus is not in use since a large amount of time will be taken for the data re-compression. Therefore, the inconvenience of not being able to use the image recording and reproducing apparatus during data re-compression can be prevented.

When the user selects data for re-compression among the data stored in the HDD 171, and sets the re-compression rate and time, the process of which was previously described, the image recording and reproducing apparatus performs re-compression with respect to the selected data according to the selected re-compression rate and time. Hereinbelow, the processes for re-compression of the image recording and reproducing apparatus will be described in greater detail.

If the user sets 'Now' as the re-compression time, the image recording and reproducing apparatus performs re-compression of the selected data at once. Accordingly, the main controller 180 controls the selected data stored to the HDD 171 to be transmitted to the MPEG decoder 183 through data management part 177. The MPEG decoder 183 expands received MPEG-2 data, restores the digital video and audio signals and outputs the restored signals.

The digital video signal output from the MPEG decoder 183 is input to the MPEG encoder 161 through the second video path switch 150a and the first video path switch 140a. The digital audio signal output from the MPEG decoder 183 is input to the MPEG encoder 161 passing through the second audio path switch 150b and the first audio path switch 140b. The main controller 180 controls the first and the second switch parts 140 and 150 to set a data transmission path such that the digital video and audio signals output from the MPEG decoder 183 can be input to the MPEG encoder 161.

The MPEG encoder 161 re-compresses and re-stores to the HDD 171 the input digital video and audio signals according to the re-compression rate. If the digital video and audio signals are recorded by 4 Mbps or 2 Mbps bitrate, respectively 2 GB or 1 GB is required for 1-hour recording. When recording by MPEG-4 1 Mbps bitrate, 0.5 GB is required for 1-hour recording. Accordingly, if certain data previously recorded by 6 Mbps bitrate is re-compressed by 4 Mbps or 2 Mbps or 1 Mbps, the required storage capacity of the recording medium decreases to ⅔, ⅓ or ⅙, respectively. Although image quality deteriorates when the compression rate is high, since an image which has been previously watched is rarely watched again, re-compressing and re-recording a previously watched image using a high compression rate is very effective especially in terms of utilizing the recording medium.

If the user selects 'Automatic' for the re-compression time, the main controller 180 stores the list of the selected data to the SDRAM 187. Such selected data are re-compressed when the user turns off the main switch of the image recording and reproducing apparatus. The re-compression is performed in the same manner as the re-compression according to the 'Now' re-compression time.

Figure 4:
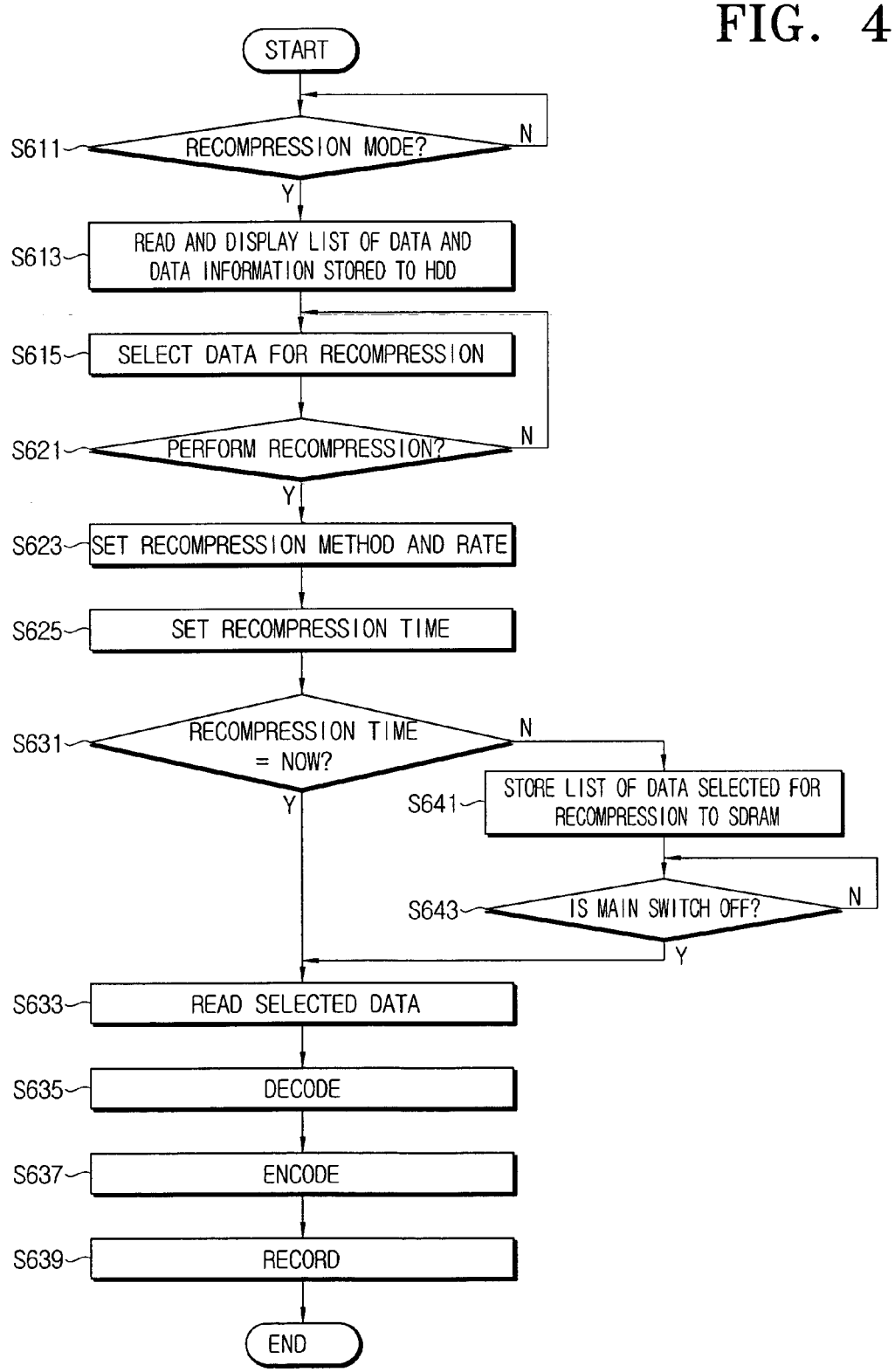
FIG. 4 is a flowchart illustrating a method for re-compressing and re-recording data according to an embodiment of the present invention.

FIG. 4 is a flowchart illustrating a method for re-compressing and re-recording data according to an embodiment of the present invention. When the user sets the 'Edit' mode using the operation buttons provided in the remote controller 200 or the key input part 193, a menu screen of the edit mode is displayed on the TV 300. When the 'Recomp' item, among the sub-menus of the displayed edit menu, is selected by the user using the direction keys of the remote controller 200 or the key input part 193, the re-compression mode begins in step S611.

In the re-compression mode, the main controller 180 controls the data management part 177 to read information on MPEG data stored to the HDD 171, and controls the OSD part 185 to output a signal corresponding to the read information. The output signal is transmitted to the TV 300 through the second video path switch 150a, the video encoder 137, the switching part 123, and the line video and audio output terminal 116. The data information may comprise a front page of an image, a title, a storage date, running time and image quality, and these are displayed on the 'Recomp' window 430. The 'Recomp' window 430 displays a data list 431 currently stored in the HDD 171 and the data information on the data pointed by the cursor, such as the title, the storage date, the running time and the image quality in step S613. The user places the cursor on the data to be re-compressed from the data list, and presses the confirmation key, thereby selecting data which will be re-compressed in step S615.

In order to re-compress the data selected in step S615, a user has to move the cursor down using the direction key and place the cursor on 'Execute' item 437, and press the confirmation key to execute the command. The main controller 180 detects whether there is an execution command from the user in step S621. When there is an execution command input by the user, the re-compression rate setting window 450 is displayed in the center of the screen such that the user can select one of the two compression rates, e.g., the HQ method of 4 Mbps and the SQ method of 2 Mbps, displayed on the re-compression rate setting window 450 using the direction keys and the confirmation key in step S623

When the user selects the compression rate, the re-compression time setting window 460 is displayed in the center of the screen. The user selects between the 'Now' and 'Automatic' schedule for compressing the data in step S625.

If the user selects 'Now' for the re-compression time, re-compression of the selected data begins immediately in step S631. Therefore, the main controller 180 controls the selected data stored to the HDD 171 to be transmitted to the MPEG decoder 183 through the data management part 177 in step S633.

The MPEG decoder 183 expands the received data of the MPEG-2 data to restore the data into digital video and audio signals, and outputs the restored signals. The digital video signal output from the MPEG decoder 183 is input to the MPEG encoder 161 through the second video path switch 150a and the first video path switch 140a. The digital audio signal output from the MPEG decoder 183 is input to the MPEG encoder 161 through the second audio path switch 150b and the first audio path switch 140b. The main controller 180 controls the first and the second switch parts 140 and 150 to set a data transmission path such that the digital video and audio signals output from the MPEG decoder 183 can be input to the MPEG encoder 161 in step S635.

The MPEG encoder 161 re-compresses the input digital video and audio signals according to the compression rate set by the user in step S637, and re-stores the signals to the HDD 171 in step S639. If the digital video and audio signals are recorded using 4 Mbps, 2 Mbps or 1 Mbps bitrate, respectively 2 GB, 1 GB or 0.5 GB is required for 1-hour recording. If certain data recorded by the 6 Mbps bitrate and requiring 3 GB for 1-hour recording, is re-compressed using 4 Mbps, 2 Mbps or 1 Mbps, requirements for the storage capacity of the recording medium decrease respectively to ⅔, ⅓ or ⅙, thereby enabling effective use of the storage capacity of the recording medium.

In step 631, if the user selects 'Automatic' for the re-compression time, the main controller 180 stores the list of the selected data to the SDRAM 187 in step S641. After this, when the user turns off the main switch of the image recording and reproducing apparatus, the selected data start to be re-compressed in step S643. The re-compression is performed as in steps S633 through S639.

As can be appreciated from the above, in certain embodiments of the present invention, data once compressed and recorded in the recording medium can be re-compressed and re-recorded at higher compression rates. Accordingly, many inconveniences of having to delete pre-stored data for additional storage, replace the recording medium with the one of larger capacity, or add an extra recording medium when image data exceeds the capacity of the recording medium in use, can be prevented, and therefore, storage capacity of the recording medium of the present invention can be very efficiently used.

While the invention has been shown and described with reference to certain embodiments thereof, it should be understood by those skilled in the art that various changes in form and details may be made therein without departing from the spirit and scope of the invention as defined by the appended claims.

What is claimed is:

1. An image recording and reproducing apparatus comprising:
    an encoder for compressing input digital image data using a first compression rate, thereby generating and outputting a first compressed data;
    a storage part for storing the first compressed data;
    a decoder for expanding the first compressed data of the storage part to restore a digital image data, and outputting the digital image data;
    a key input part which outputs a re-compression command signal for conversion of the first compressed data into a second compressed data, wherein the key input part comprises a main power switch which outputs one of a power-on signal for supplying power and a power-off signal for blocking the power supply, such that the data re-compression is performed when the image recording and reproducing apparatus is not in use;

an on-screen display for displaying an edit menu with options of combining, dividing, deleting, partial deleting and recompressing digital image data; and a controller for controlling the decoder, the encoder, and the storage part such that the digital image data output from the decoder is transmitted to the encoder, wherein the digital image data output from the decoder is received and compressed by the encoder at a second compression rate into second compressed data, and stored in the storage part of the image recording and reproducing apparatus upon receiving the power-off signal after the re-compression command signal.

2. The image recording and reproducing apparatus of claim 1, further comprises:

an input signal conversion part for converting input analog image data into the digital image data and transmitting the digital image data to the encoder; and an output signal conversion part for converting the digital image data output from the decoder into the analog image data.

3. The image recording and reproducing apparatus of claim 2, further comprises:

a first switch part for inputting to the encoder one of the digital image data output from the input signal conversion part and the decoder according to control of the controller, and wherein the controller, upon receiving the re-compression command signal, controls the first switch part so that the digital image data output from the decoder is input to the encoder.

4. The image recording and reproducing apparatus of claim 2, further comprises:

a second switch part for inputting the digital image data output from the decoder, to one of the encoder and the output signal conversion part according to the controller, and wherein the controller, upon receiving the re-compression command signal, controls the second switch part so that the digital image data output from the decoder is input to the encoder.

5. The image recording and reproducing apparatus of claim 1, wherein the first compressed data is in a moving picture experts group (MPEG)-2 format, and the second compressed data is in a MPEG-4 format.

6. A method for re-compressing data in an image recording and reproducing apparatus which stores first compressed data of a first compression rate, the method comprising the steps of:

displaying an edit menu on a display device with options of combining, dividing, deleting, partial deleting and recompressing digital image data;

inputting an automatic-re-compression command for converting the first compressed data into a second compressed data after a main power switch of the image recording and reproducing apparatus is turned off, such that the data re-compression is performed when the image recording and reproducing apparatus is not in use, and;

upon receiving the re-compression command, expanding the first compressed data to restore a digital image data;

compressing the restored digital image data by a second compression rate, thereby generating the second compressed data; and storing the second compressed data in the image recording and reproducing apparatus.

7. The method of claim 6, wherein the first compressed data is of a moving picture experts group (MPEG)-2 format, and the second compressed data is in an MPEG-4 format.

* * * * *

UNITED STATES PATENT AND TRADEMARK OFFICE
CERTIFICATE OF CORRECTION

PATENT NO.        : 7,668,441 B2                                    Page 1 of 1
APPLICATION NO. : 10/914308
DATED             : February 23, 2010
INVENTOR(S)       : Chul-min Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1255 days.

Signed and Sealed this

Twenty-eighth Day of December, 2010

David J. Kappos
*Director of the United States Patent and Trademark Office*